United States Patent Office 2,954,526
Patented Sept. 27, 1960

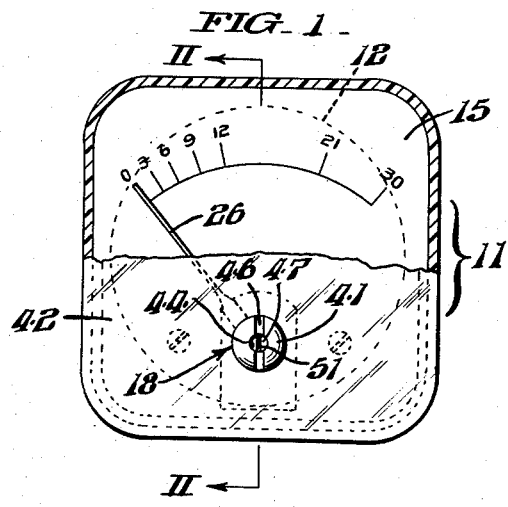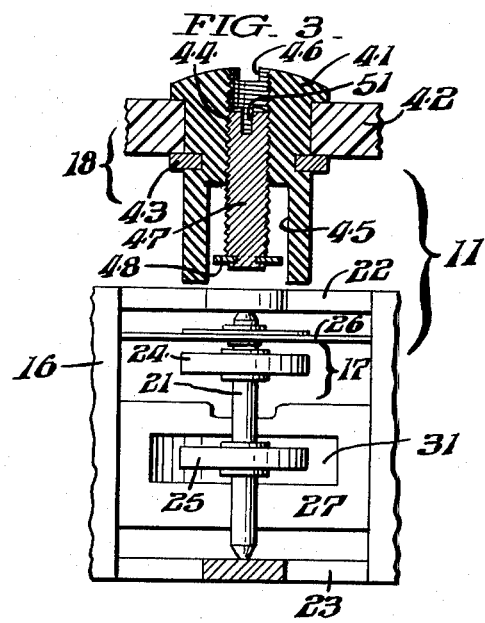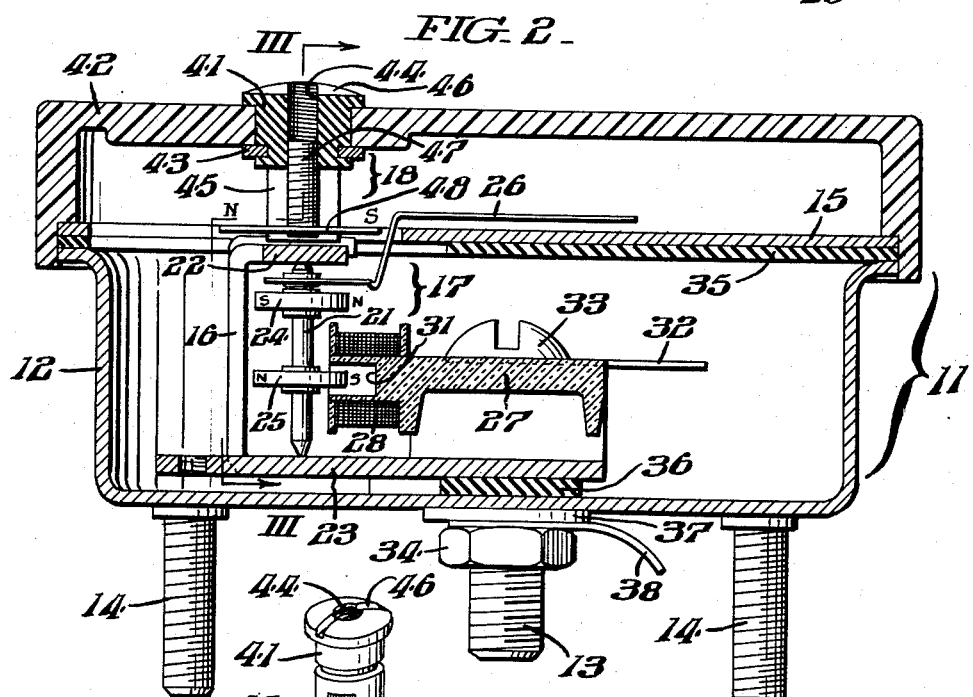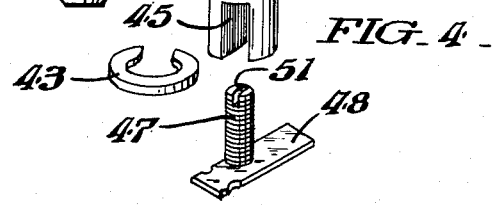

2,954,526

ELECTRICAL MEASURING INSTRUMENT

William E. Pfeffer, Perkasie, and Robert R. Gombert, Sellersville, Pa., assignors to Paul Mood, Lester Void, and William E. Pfeffer, copartners, trading under the name of The Electro-Mechanical Instrument Company, Perkasie, Pa.

Filed Dec. 29, 1958, Ser. No. 783,320

2 Claims. (Cl. 324—146)

This invention relates to improvements in an electrical measuring instrument, and more particularly concerns an electrical measuring instrument having a calibration and zero adjustment assembly which is accessible from the outside of the instrument.

It is an object of this invention to provide an electrical measuring instrument having a calibration and zero adjustment assembly which is accessible from the outside of the instrument.

It is another object of this invention to provide such an instrument wherein the calibration and zero adjustment controls are combined in one mechanism, thereby providing for ease in operation, and economy in manufacture.

Other objects and advantages of this invention, including its simplicity and economy, will further become apparent hereinafter and in the drawings, in which:

Fig. 1 is a front view of an electrical measuring instrument constructed in accordance with this invention, with parts broken away to show important details;

Fig. 2 is a view in section taken as indicated by the lines and arrows II—II which appear in Fig. 1;

Fig. 3 is a fragmentary view in section taken as indicated by the lines and arrows III—III which appear in Fig. 2; and Fig. 4 is an exploded view of the control mechanism of the invention.

Although specific terms are used in the following description for clarity, these terms are intended to refer only to the structure shown in the drawings and are not intended to define or limit the scope of the invention.

Turning now to the specific embodiment of the invention selected for illustration in the drawings, there is shown an electrical measuring instrument 11 having a casing 12, electrical connection posts 13, threaded mounting posts 14, a dial face 15, a support bracket 16 mounted within casing 12, a movement 17, and control mechanism 18.

Movement 17 includes an arbor 21 which is rotatably mounted between the front member 22 and the rear member 23 of support bracket 16, permanent magnets 24 and 25 with polarities as shown mounted on arbor 21, and pointer 26 mounted on arbor 21. Permanent magnets 24 and 25 and pointer 26 rotate with arbor 21. Also mounted within casing 12 is an insulating block 27 which has wound thereon an electrical coil 28 and which has formed therein a chamber 31 which is adapted to receive magnet 25 which acts as a measuring magnet. Electrical contact lugs 32 have the ends of coil 28 soldered thereto, and are held in place by the heads 33 of posts 13 and associated nuts 34. Also provided are insulating plates 35, 36, and 37, and electrical conductor 38.

Control mechanism 18 includes a zero adjustment element in the form of a nut 41 which is rotatably mounted in a transparent dial face cover 42 and held in place with the aid of a washer 43. Zero adjustment screw 41 is made of a non-magnetic material and has an internally threaded bore 44 and a recess or bifurcation 45 which is formed in a pendent prolongation below the bore 44. Also provided is a slot 46 which is adapted to receive a screwdriver for rotating screw 41.

Positioned within bore 44 is a calibration adjustment screw 47 which has rotatably attached thereto a permanent control magnet 48 which is positioned within recess 45. A slot 51 is provided in the head of calibration adjustment screw 47 and is adapted to receive a screwdriver for rotating screw 47. The sides of recess 45 prevent the rotation of control magnet 48 when calibration adjustment screw 47 is being turned. Accordingly, control magnet 48 is restricted to movement up and down along the axis of zero adjustment screw 41 when calibration adjustment screw 47 only is being turned. This provides for calibration of electrical measuring instrument 11 without disturbing the zero setting of the instrument.

When it is desired to adjust the zero setting of the instrument, the zero adjusting nut 41 is rotated, and this rotation causes the rotation of control magnet 48 without raising or lowering it to disturb its calibration setting.

In the operation of instrument 11, it is connected into an electrical circuit which energizes the coil 28 to rotate measuring magnet 25 and pointer 26 to move pointer 26 across the dial face 15 to finally point at a number indicated thereon.

The polarity of the magnets 24, 25, and control magnet 48 are as indicated, so that the control magnet 48 exerts a retarding force on the rotation of the other magnets, thereby providing for zero position and calibration of the instrument 11.

It is to be noted that control mechanism 18 is accessible from the front of the instrument, provision being made for turning zero adjustment nut 41 and calibration adjustment 47 without removing even the dial face cover 42. Calibration adjustment screw 47 is made of a non-magnetic material, such as brass, and zero adjustment screw 41 is preferably made of a plastic material. Both the zero adjustment control and the calibration adjustment control are part of the same mechanism which provides for ease of operation as well as economy in manufacture. Control mechanism 18 is easily replaceable without disturbing the other elements of the measuring instrument. Even though both controls form part of the same mechanism, each adjustment may be made independently of the other, and is made without disturbing the other setting.

It is to be understood that the form of the invention herewith shown and described is to be taken as a preferred embodiment. Various changes may be made in the shape, size, and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

Having thus described our invention, we claim:

1. An electrical measuring instrument having an open top casing, a dial face extending over the open top of the casing, a transparent dial cover overlying the dial face with provision of an interspace therebetween, a vertical axis arbor rotatively supported in the casing below the dial face, a pointer affixed to the arbor and adapted to swing over the dial face in the interspace aforesaid, a stationary horizontal axis current carrying coil within the casing beneath the dial face, a permanent magnet disk also affixed to the arbor and extending edgewise into the hollow of the coil for flux reaction with the flux of the coil to rotate the arbor, an adjusting nut of non-metallic material axially aligned with the arbor and restricted to rotation in the dial cover, said nut having a pendent bifurcated prolongation, a screw threadedly engaged in the nut, a permanent calibrating and zero setting magnet connected to the bottom end of the screw and constrained against relative rotation with the screw within the bifurcation of the nut, whereby upon turning the nut said calibrating and zero setting magnet is rotatively movable relative to the permanent magnet disk on the arbor, and whereby upon turning the screw the calibrating and zero setting magnet is vertically adjustable relative to the arbor magnet.

2. The invention according to claim 1, wherein the calibrating and zero setting magnet and its adjusting means are in the form of a self-contained unit capable of replacement in the dial cover without disturbing any of the other parts of the instrument.

References Cited in the file of this patent

UNITED STATES PATENTS

| | | |
|---|---|---|
| 2,102,409 | Faus | Dec. 14, 1937 |
| 2,338,694 | Lingel | Jan. 4, 1944 |
| 2,755,444 | Pfeffer | July 17, 1956 |

FOREIGN PATENTS

| | | |
|---|---|---|
| 839,385 | Germany | May 19, 1952 |